(12) United States Patent
Skiena et al.

(10) Patent No.: US 7,440,889 B1
(45) Date of Patent: *Oct. 21, 2008

(54) SENTENCE RECONSTRUCTION USING WORD AMBIGUITY RESOLUTION

(75) Inventors: Steven S. Skiena, New York, NY (US); Harald Rau, Wurzburg (DE)

(73) Assignee: Research Foundation of the State University of New York, Stony Brook, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/287,031

(22) Filed: Apr. 6, 1999

Related U.S. Application Data

(63) Continuation of application No. 09/073,096, filed on May 5, 1998, now Pat. No. 5,960,385.

(51) Int. Cl.
*G06F 17/27* (2006.01)
(52) U.S. Cl. .................................. 704/9; 379/93.01
(58) Field of Classification Search .................. 704/1, 704/8–10, 251, 270; 379/52, 93, 96, 97, 379/93.01; 707/530, 533
See application file for complete search history.

(56) References Cited

U.S. PATENT DOCUMENTS

| | | | | |
|---|---|---|---|---|
| 4,868,750 A | * | 9/1989 | Kucera et al. ................... | 704/9 |
| 5,031,206 A | * | 7/1991 | Riskin ........................ | 379/97 |
| 5,146,405 A | * | 9/1992 | Church ........................... | 704/9 |
| 5,258,909 A | * | 11/1993 | Damerau et al. ................ | 704/1 |
| 5,541,836 A | * | 7/1996 | Church et al. ................... | 704/7 |
| 5,828,991 A | * | 10/1998 | Skiena et al. ................... | 704/1 |
| 5,960,385 A | * | 9/1999 | Skiena et al. ................... | 704/9 |
| 6,052,443 A | * | 4/2000 | Perera et al. ............. | 379/93.18 |
| 6,801,190 B1 | * | 10/2004 | Robinson et al. ............ | 345/173 |
| 7,098,826 B2 | * | 8/2006 | Madireddy et al. .......... | 341/141 |

\* cited by examiner

*Primary Examiner*—Susan McFadden
(74) *Attorney, Agent, or Firm*—F. Chau & Associates, LLC

(57) ABSTRACT

Single stroke text entry via a telephone keypad is subject to ambiguities resulting from the overloading of three letters on one key. After text is entered the three letter per position code block represented by the key strokes for a word position is hashed to all matches in a stored dictionary type word list. The resulting word group of alternative word choices for that word position is subjected to probability analysis. Probabilities of usage of specific words are evaluated based on frequency of usage in the selected language, such as English. Syntax type probabilities of word sequencing are evaluated through (i) rules based on transitional probability of use of two particular words in sequence in English usage and (ii) rules based on probability of relative positioning of words of particular word categories (e.g., nouns and adjectives) in a sentence structure in English usage. A word trellis or lattice represents choice paths for alternative sentence structures. By selecting the path with the highest probability values, highly accurate sentence reconstruction is provided. In addition to use in the telephone keypad text entry context, described systems and methods are also applicable to a variety of word processing and other systems wherein computer stored text is subject to ambiguities as to intended words.

22 Claims, 8 Drawing Sheets

| Number of coinciding codes | Words | Code Strings |
|---|---|---|
| 1 | 41122 | 41122 |
| 2 | 4896 | 2448 |
| 3 | 1476 | 492 |
| 4 | 588 | 147 |
| 5 | 300 | 60 |
| 6 | 174 | 58 |
| 7 | 42 | 6 |
| 8 | 48 | 6 |
| 9 | 9 | 1 |
| 10 | 0 | 0 |
| 11 | 11 | 1 |

FIG. 5

| Code | Word Candidates | Count |
|---|---|---|
| 22737 | cases cares cards capes caper bases baser bares barer bards | 11 |
| 46637 | inner hoofs hoods hones honer homes homer goods goner | 9 |
| 269 | coy cox cow boy box bow any amy | 8 |
| 76737 | sores sorer roses ropes roper poses poser pores | 8 |
| 7283 | scud save sate rave rate pave pate Saud | 8 |
| 729 | say sax saw ray raw pay pax paw | 8 |
| 72837 | saves saver sates raves rates rater paves pater | 8 |
| 2273 | case care card cape base bare bard acre | 8 |
| 7867 | suns sums stop runs rump puns pump | 7 |
| 752837 | slaves slaver slates slater skates skater plates | 7 |
| 4663 | hoof hood hone home goof good gone | 7 |

FIG. 6

| \multicolumn{3}{c}{*List of Word Tags*} | | |
|---|---|---|
| Tag | Description | Examples |
| ABL | pre-qualifier | *quite, rather* |
| ABN | pre-quantifier | *half, all* |
| AP | post-determiner | *many, next* |
| AT | article | *a, the, no* |
| CC | coordination conjunction | *and, or* |
| DT | singular determiner | *this, that* |
| DTS | plural determiner | *these, those* |
| JJ | adjective | *compellable* |
| NN | sing. or mass noun | *powder* |
| NNS | plural noun | *drafts* |
| NR | adverbial noun | *home, west* |
| VB | verb, base form | *take* |
| VBD | verb, past tense | *took* |
| VBG | verb, present participle, gerund | *taking* |
| VBN | verb, past participle | *taken* |
| VBZ | verb, 3rd singular present | *takes* |
| WDT | wh- determiner | *what, which* |

FIG. 8

| Phase | Characters identified | Errors of total | Accuracy | Time |
|---|---|---|---|---|
| Total | 3155498 | 29875 | 99.05% | 1.03 ms/char |
| Blank | | | | |
| Recognition | 15.82% | 0.45% | 99.97% | 12.88% |
| Unknown Word | 5.31% | 71.28% | 87.28% | 0.74% |
| Split | 0.64% | 0.57% | 99.15% | 0.03% |
| Affix | 1.58% | 12.04% | 92.79% | 0.07% |
| Match | 2.41% | 37.12% | 85.41% | 0.35% |
| Viterbi | 0.68% | 21.55% | 70.03% | 0.29% |
| Sentence Disambiguation | 78.88% | 28.27% | 99.66% | 86.11% |

FIG. 9

| Text | characters | characters correct | non-blanks correct | words correct | time per character |
|---|---|---|---|---|---|
| Clinton Speeches | 1073593 | 99.04% | 98.86% | 97.67% | 0.97ms |
| Herland | 278670 | 98.24% | 97.89% | 97.02% | 0.97ms |
| Moby Dick | 1123581 | 96.85% | 96.25% | 94.75% | 1.14ms |
| Bible | 3961684 | 96.20% | 95.39% | 95.39% | 1.33ms |
| Shakespeare | 4558202 | 95.20% | 94.21% | 92.86% | 0.99ms |

FIG. 10

FOURSCORE AND SEVEN YEARS AGO OUR FATHERS BROUGHT FORTH ON THIS CONTINENT A NEW NATION CONCEIVED IN LIBERTY AND DEDICATED TO THE PROPOSITION THAT ALL MEN ARE CREATED EQUAL.

NOW WE ARE ENGAGED IN A GREAT CIVIL WAR TESTING WHETHER THAT NATION OR ANY NATION SO CONCEIVED AND SO DEDICATED CAN LONG ENDURE. WE ARE MET ON A GREAT BATTLEFIELD OF THAT WAS. WE HAVE COME TO DEDICATE A PORTION OF THAT FIELD AS A FINAL SERVING PLACE FOR THOSE WHO HERE HAVE THEIR LIVES THAT THE NATION MIGHT LIVE . IT IS ALTOGETHER FITTING AND PROPER THAT WE SHOULD DO THIS.

BUT IN A LARGER SENSE WE CAN NOT DEDICATE WE CAN NOT CONSECRATE WE CAN NOT HALLOW THIS GROUND. THE BRAVE MEN LIVING AND DEAD WHO STRUGGLED HERE HAVE CONSECRATED IT FAR ABOVE OUR POOR POWER TO ADD OR DETRACT. THE WORLD WILL LITTLE NOTE NOR LONG

FIG. 11

SENTENCE RECONSTRUCTION USING WORD AMBIGUITY RESOLUTION

This application is a: Continuation of U.S. application Ser. No. 09/073,096 filed on May 5, 1998 now U.S. Pat. No. 5,960,385.

This invention relates to resolution of word ambiguity in the context of a sentence structure having a plurality of word choices for at least one word position. More particularly, sentences entered by use of a three letter per key telephone keypad are reconstructed using syntax based word use rule sets reflecting word sequence and word category positioning usage in a selected language.

BACKGROUND OF THE INVENTION

In entry of text by use of a standard typewriter form of keyboard each key stroke represents a single letter on a non-ambiguous basis. For many applications it is desirable to be able to enter text by use of a readily available telephone having a standard telephone keypad. For example, such text entry would enable an untrained caller to communicate with a hearing-impaired person from any available telephone. However, telephone keypads are overloaded with three letters to a single key which creates ambiguities as to which letter is intended by a single key stroke. Prior approaches toward resolving the ambiguities have typically required two or more key strokes for entry of each letter. Resulting text entry routines have been cumbersome, slow and frustrating to use.

The marriage of computing and telecommunications has spawned an amazing variety of new services and capabilities. Many individuals are currently excluded from participation because they do not have ready access to an alphanumeric terminal and modem. However, most homes in many countries already contain a simple on-line terminal in the form of a telephone. Anyone who has ever placed a telephone call is familiar with the fact that the 2-9 keys of a standard phone dial are each labeled with three letters of the alphabet (the letters Q and Z do not appear). These labels have been used to provide mnemonics to aid in memorizing phone numbers (such as 1-800-FLOWERS) and in modern messaging systems for entering single word strings (such as a database of employee names in a company switchboard application). However, the overloading of three letters on a single key creates a potential ambiguity as to which character was intended.

Resolution of this overloading ambiguity is necessary for unambiguous text entry. For applications involving a small, predetermined vocabulary (such as the switchboard application noted above), a simple hashing scheme will suffice. However the problem becomes considerably more difficult if arbitrary text is to be entered (i.e., text entry free of predetermined constraints on word usage).

A variety of different text entry conventions have been proposed for use with telephone keypad to resolve or reduce ambiguities resulting from the multi-letter keys. Without attempting to address all prior techniques, it can be noted that numerous prior approaches have addressed ambiguity on a letter level. For example, "L" is the third character on the number 5 and an unambiguous entry can be made by pressing the 5 key three times, followed by pressing the 0 key to indicate completion of entry of the third letter on the 5 key. Alternatively, L can be entered by pressing the key followed by another key predesignated to indicate the third letter on the 5 key. In each case the letter L is unambiguously entered, but a multi-stroke procedure must be learned and then carried out for each letter.

Other approaches have addressed ambiguity resolution at a word level. Typically, if three keys are activated to represent a three letter word, for example, a dictionary type word list can be accessed to identify all English words formable by the permutations of the three letters represented in each of the three successive letter positions. One approach is to limit word possibilities to a restricted list of words, names or locations so that it is predetermined that only one word can be represented by that specific three key sequence. A word level approach is discussed in the article, "Let Your Fingers Do the Spelling: Disambiguating Words Spelled With the Telephone Keypad", J. R. Davis, AVIOS Journal, 9:57-66, March 1991. Unambiguous operation with a limited word list of streets, words or people is discussed. This article specifically acknowledges the absence of any capability to go beyond a word level operation constrained by a predefined limited word list, concluding that: "Implicit disambiguation does not appear feasible for entering unrestricted English text".

A word level approach which permits less restricted text entry is scribed in U.S. Pat. No. 4,650,927, issued Mar. 17, 1987. This patent recognizes the basic inability to choose the correct word when the text entry via a telephone keypad results in a list of two or more word possibilities for a particular word position. Instead of reducing word ambiguity by limiting the list of acceptable words, this patent presents the list of possible words to the human recipient of a message. Users presented with such word choices must then use their own judgment in selecting the word which makes the most sense to them in the sequential context presented to them.

Basic shortcomings of all known prior approaches are that they have been either slow and cumbersome if operating on a letter level of ambiguity resolution, or limited in overall capability and performance if operating on a word level of ambiguity resolution. No known prior approach has provided a practical capability of ambiguity resolution on a sentence level utilizing syntax relationships regarding usage of words in a selected language.

Objects of the present invention are, therefore, to provide new and improved sentence reconstruction methods and systems having one or more of the following capabilities:

resolution of word ambiguities based on syntax relationships regarding word usage;

unrestricted text entry via a telephone keypad;

word ambiguity resolution based upon probabilities of word usage and probabilities of one or both of particular word sequences and positioning of words of particular word categories; and simple text entry protocol.

SUMMARY OF THE INVENTION

In accordance with the invention, a sentence reconstruction method, for resolving word ambiguities in a selected language sentence structure entered using single stroke activation of a key set including text entry keys each representing a group of letters, includes the following steps:

(a) providing first key stroke indicia each ambiguously representing a letter of a group of letters and second key stroke indicia including indicia representing spaces between words;

(b) partitioning (by use of the second key stroke indicia) the first key stroke indicia into a sequence of word positions, each word position comprising a code block represented by at least one of the first key stroke indicia;

(c) accessing a database including a word list to identify for an individual word position a word group including alternative word choices formable from the letter groups represented by the code block for such word position;

(d) repeating step (c) for the sequence of word positions to identify a corresponding word group including at least one word choice for each of a plurality of word positions;

(e) utilizing a stored word use rule set representative of relative frequency of particular word usage in the selected language to derive, for the word group for one of the word positions, probability values for word choices for that word position;

(f) utilizing a stored language rule set representative of usage in the selected language to derive probability values for a sequencing of individual word choices for the word position relative to at least one word choice for an adjacent word position in the sentence structure, said language rule set including rules in the following categories (i) rules based on transitional probability of use of particular word sequences, and (ii) rules based on probability of relative positioning of words of particular word categories in a sentence structure;

(g) repeating steps (e) and (f) for any additional word positions having an associated word group including a plurality of alternative word choices; and (h) selecting, by use of the probability values derived in steps (e) and (f), one word from each word group for inclusion at a respective word position in a reconstructed sentence structure.

In a preferred embodiment of the sentence reconstruction method, in step (a) the second key stroke indicia additionally includes indicia representing a period delimiting the sentence structure and step (b) additionally includes partitioning the word positions into at least one sentence. Between steps (c) and (d) an additional step may also be included as follows:

(x) for each word position for which no word group including a least one word is identified in step (c) utilizing a stored word assembler to attempt to identify at least one of a suffix construction, a prefix construction and a combination word construction, and to thereby identify a word group including at least one word for the word position.

The sentence reconstruction method may additionally include the following step:

(j) using the words selected in step (h) to provide a reconstruction of the entered sentence structure in at least one of the following forms: a viewable display, a printout, a synthesized voice output.

For a better understanding of the invention, together with other and further objects, reference is made to the accompanying drawings and the scope of the invention will be pointed out in the accompanying claims.

BRIEF DESCRIPTION OF THE DRAWINGS

FIG. 5 illustrates word ambiguities resulting from text entry via a telephone keypad.

FIG. 6 illustrates telephone keypad code strings with greatest ambiguities.

FIG. 8 shows samples of word tags used in accordance with the invention.

FIG. 9 is useful in considering a performance analysis.

FIG. 10 is useful in describing results achieved in use of the invention.

FIG. 11 is a sample of reconstructed sentence structure provided by operation of the invention.

DESCRIPTION OF THE INVENTION

Figure 1:
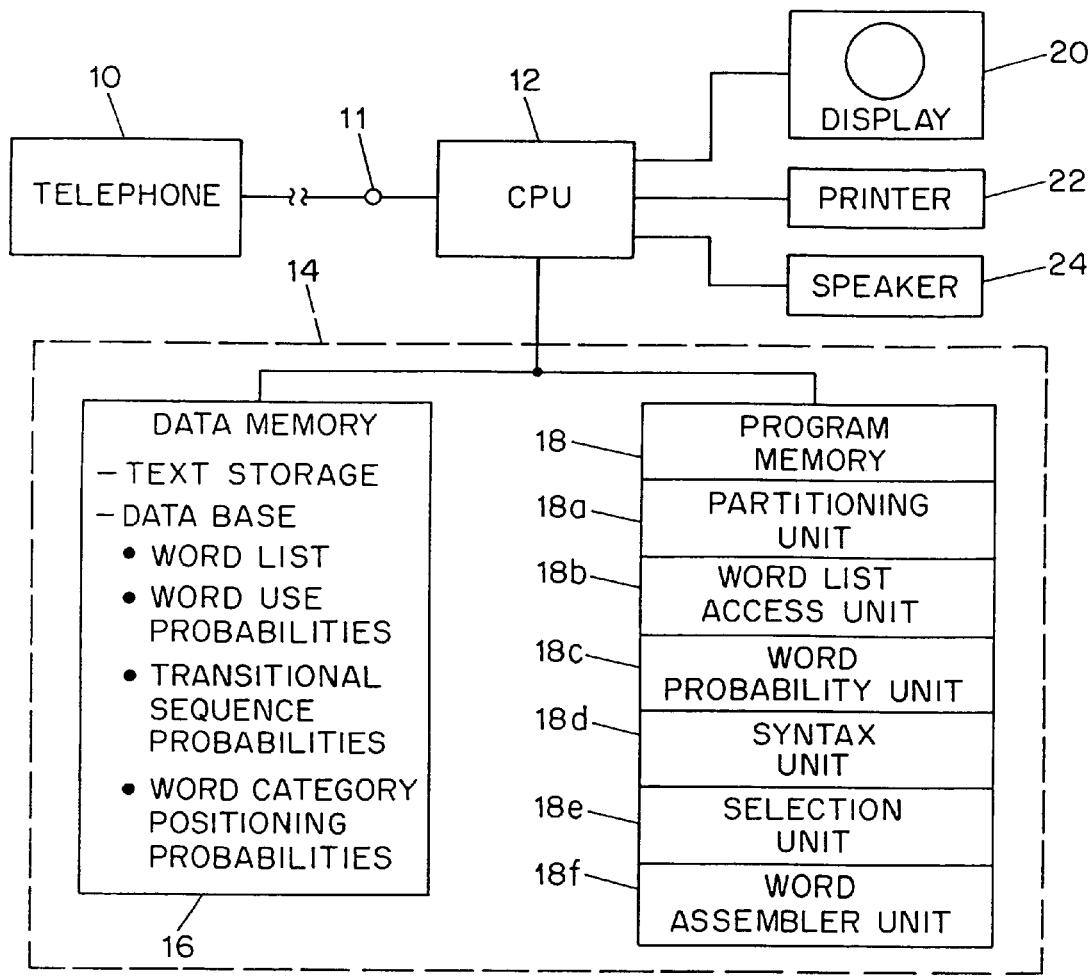
FIG. 1 is a block diagram of an embodiment of a sentence reconstruction system in accordance with the invention.

FIG. 1 illustrates an embodiment of a sentence reconstruction system in accordance with the invention. Following a brief description of the FIG. 1 system, theory and operation of a sentence reconstruction method using the invention will be described in greater detail.

Figure 2:
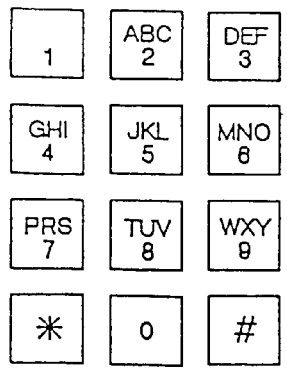
FIG. 2 shows a telephone keypad.

As shown, the FIG. 1 system includes an entry device, shown as telephone 10 having a keypad as represented in FIG. 2. When a user presses a three-letter key, such as one of keys 2-9 in FIG. 2, the entry device 10 provides a first key stroke indicia in the form of a telephone tone signal which can be transmitted via a telephone system, received and stored in memory (e.g., in digital form) in known manner. As will be discussed further, second key stroke indicia can also be provided, as by pressing the asterisk key to indicate a blank character (e.g., a space between words) or by pressing the pound key to indicate a sentence limit or termination. The entry device 10 is thus usable to enter text in the form of one or a series of sentence structures. For present purposes, "a sentence structure" is defined as a complete sentence, a sentence fragment, a phrase, a clause or other sequence of words put together in view of one or more syntax considerations based on word usage in a selected language, such as English.

A processor, shown as CPU 12 which may comprise a microprocessor, is responsive to entry device 10 to cause the first and second key stroke indicia, coupled via input terminal 11, to be stored in memory unit 14. It will be appreciated that entry device 10 may typically be any telephone of a type having a keypad for providing standard tone signals and may be at any convenient remote or other location. Different telephones may be connected at different times and may have touch panels or other arrangements permitting text entry. As shown, memory unit 14, which may be any appropriate type or form of storage device or devices, includes a data memory portion 16 and a program memory portion 18. Data memory portion 16 includes both database storage as will be described and text storage suitable for storage and retrieval of first and second key stroke indicia resulting from entry of one or a series of sentence structures via telephone 10.

The database storage of data memory portion 16 is arranged in accordance with an embodiment of the invention to store the following. A stored word list (which may include on the order of 50,000 words representative of all relatively commonly used English words) is usable to identify for an individual word position a word group including all alternative word choices formable by permutation of the letter groups represented by a code block of the letters carried by the keys activated for entry of a particular word. A stored word use rule set is arranged to be representative of relative frequency of particular word usage in the selected language in order to enable derivation of probability values for word choices in a sentence structure. A stored language rule set representative of usage in the selected language enables derivation of probability values for word sequencing (e.g., for sequencing of individual word choices or candidates for a given word position, relative to a word choice for an adjacent word position in a sentence structure). The language rule set includes rules in the following categories (i) rules based on transitional probability of use of particular word sequences, and (ii) rules based on probability of positioning of words of particular word categories in a sentence structure. Thus, category (i) may provide the relative probability that two particular words will be used in sequence in common usage in the English language. Category (ii) may, for example, provide the probability that a word categorized as a noun will appear at the end of a sentence. The nature of these rule sets will be further described.

The program memory portion 18 of the memory unit 14 is arranged in accordance with this embodiment of the invention to comprise the following which may be considered as program units usable with the CPU 12 to practice the invention. A partitioning unit 18*a* is responsive to the second key stroke indicia to partition the first key stroke indicia, as stored in memory portion 16, into a sequence of word positions. Each word position will thus comprise a code block represented by at least one of the first key stroke indicia (e.g., indicia of activation of the ghi key). An access unit 18*b* is responsive to the code block for each word position to access the word list stored in data memory portion 16 to identify for an individual word position a word group including alternative word choices formable from the letter groups represented by the code block. It will be appreciated that for some code blocks the letter group will uniquely represent only one word (in the simplest case, the abc letter group represents only the word "a"). However, it is most likely at least one code block of a sentence structure will provide letter groups formable into a plurality of words, presenting a word ambiguity addressable by the invention. A word probability unit 18*c* stored in program memory portion 18 is arranged to utilize the word use rule set stored in data memory portion 16 to derive, for the word group for each word position, probability values for word choices for each of the word positions (e.g., based on frequency of occurrence in common English usage). A syntax unit 18*d* is arranged to utilize the rules of categories (i) and (ii) of the language rule set stored in data memory portion 16. The syntax unit is thus enabled to derive probability values for a sequencing of alternative word choices for individual word positions relative to word choices for adjacent word positions in the sentence structure (e.g., based on two word sequences and word category positioning as discussed). A selection unit 18*e* is arranged to utilize the probability values derived in units 18*c* and 18*d* to select one word choice from the word group for each word position for inclusion at the respective word position in the sentence structure. As will be described further, the word choices selected for inclusion in the reconstructed sentence structure will typically represent the word choices associated with the highest probability values or costs as derived. Program memory portion 18 may also store a word assembler unit 18*f* for identification of suffix construction, prefix construction and combination word construction with respect to word positions for which access unit 18*b* is unable to identify any word choice from the word list which corresponds to the letter groups represented by the code block for the respective word position.

The FIG. 1 sentence reconstruction system further includes an output device to provide a representation of the entered sentence structure (in the form of the sentence structure as reconstructed) for use by an individual utilizing the system. As illustrated, the output device may comprise a display 20 providing a viewable display of the sentence structure, a printer 22 providing a hard copy printout, a speaker 24 providing a synthesized speech output, or other appropriate device or combination thereof suitable for making the sentence structure available in a human perceivable format. The invention has been described in the context of a single sentence structure, such as a complete sentence, which may be a portion of more extensive text including a series of sentence structures.

Basic Operation

As background to a description of operation, considerations relevant to the bounds of achievable text reconstruction under information theory constraints will be briefly addressed. Before attempting to reconstruct English text from single-key phone codes, it should be established that there is enough information available to make such a reconstruction possible. Formally, an information source S with a repository of possible messages $M_k$, $1 \leq k \leq n$ selects one message for transmission. Information theory defines the information content or source entropy H(S) of a set of messages in terms of the probability $P(M_i)$ that this message is chosen by the source, as the average value of information associated with each of the messages as represented in the following equation.

$$H(S) = -\sum_{i=1}^{n} P(M_i)\log_2 P(M_i)$$

The source entropy H(S) denotes the average information content conveyed per message, in units of bits. The source entropy reaches its maximum for the case of equally likely messages, when $H(S)=\log_2 n$.

For present purposes, the message source is the English text itself and measuring the true entropy of English is a non-trivial problem. If one imagines the message source to consist of 26 letters, the space and the period, each of which are used with equal probability, then the source entropy is $\log_2 28=4.81$ bits per letter. Since the information content which can be transmitted by using the phone keypad is at most $\log_2 10=3.32$ bits per keystroke, there remains a considerable deficit which must be overcome.

English, however, does not use all letters with an equal probability. Using the probabilities from the Brown Corpus (as provided in *Frequency Analysis of English Usage: Lexicon and Grammar*, edited by W. N. Francis, Houghton Mifflin, Boston, 1982) the source entropy of first-order English drops to 4.16 bits per letter. However, standard assignment of letters to phone keys is not optimal and lowers the transmitted entropy to approximately 3.07 bits per letter, leaving a deficit of over one bit per symbol. A better measure of the entropy of English comes from considering entire words or sentences as messages, rather than the individual letters. On a word-by-word basis, estimates of the entropy of English drop to below 2.2 bits per letter (see C. E. Shannon, "Prediction and Entropy of Printed English", *Bell System Technical Journal*, 30:50-64, 1951). In a series of experiments on full English text, Shannon obtained an estimate of the entropy of English as between 0.6 and 1.3 bits per letter. Since the information capacity of telephone keycodes exceeds Shannon's estimate of entropy, in principle it is possible to accurately reconstruct the source text by exploiting context and other linguistical constraints.

Figure 3:
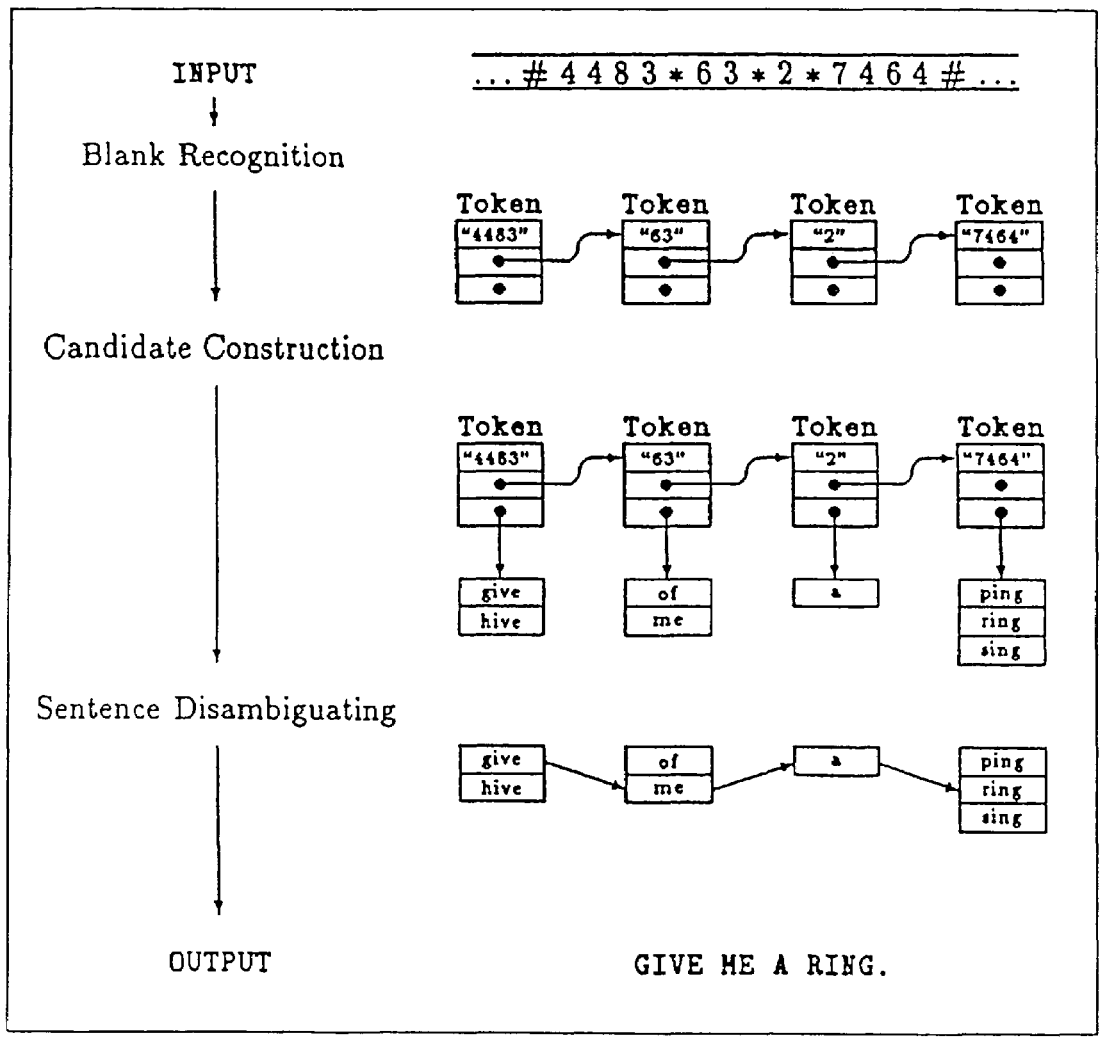
FIG. 3 illustrates phases of a sentence reconstruction method using the invention.

A reconstruction system using the present invention takes as input a stream of digits, and outputs a maximum-likelihood reconstructed English source text. The following input convention is used in a preferred embodiment. To supplement the traditionally-labeled keys 2-9, the asterisk key * is used for the letters Q, Z and ƀ, the blank character. The pound key # serves as sentence delimiter. The 0 and 1 keys have no meaning and could be used for additional features. Hyphens and other punctuation are omitted or substituted by blank characters. Ordinal and cardinal numbers are entered by spelling the numbers out in this exemplary convention which ends each sentence with a #. The reconstruction proceeds on a sentence-by-sentence basis in four phases as represented in FIG. 3.

Initially, blanks are identified by use of partitioning unit 18a stored in program memory portion 18. The first phase partitions the input stream into word positions or tokens by recognizing the blank characters, and is rendered non-trivial because of overloading the * key with Q and Z in the chosen input convention. Since blanks are much more common than Q and Z, simply marking all asterisks as blank would be correct 98.99% of the time. However, a better job of identifying the real blanks can be done.

Figure 4:
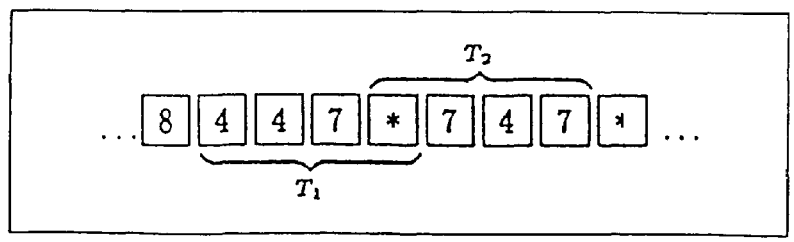
FIG. 4 illustrates a blank resolution technique usable in the FIG. 3 method.

The decision as to whether an asterisk represents a blank depends on the character context of the asterisk. A window of three characters preceding and following the asterisk is considered as context, as in FIG. 4. These pre-asterisk and post-asterisk trigrams are composed of phone codes, resulting in $10^3$ possible combinations for each trigram. For each trigram, there is tabulated how often the asterisk was intended as Q, Z, or blank, yielding six quantities:

$T_1^c$: How often did the letter $c \in \{Q, Z, \flat\}$ occur as the fourth character of the pre-asterisk trigram?

$T_2^c$: How often did the letter $c \in \{Q, Z, \flat\}$ occur as the first character of the post-asterisk trigram?

The blank confidence is defined as represented by the following equation.

$$C(*-\flat) = \frac{T_1^\flat + T_2^\flat}{\sum_{c=Q,Z,\flat}(T_1^c + T_2^c)}$$

The asterisks which are classified with high confidence as $\flat$ are now so labeled, while other asterisks remain unidentified until later phases of our algorithm. In setting the confidence threshold C (*–$\flat$)=1.0, 81.63% of all asterisks are marked as $\flat$ while making no mistakes. Using lower confidence thresholds to classify the asterisks significantly increases the number of blanks correctly marked, at a cost of a small number of errors. The best accuracy for reconstructing asterisks is obtained for a marking threshold of 99.97%. The overall blank recognition accuracy is then 99.91%. Of course, if the text input convention were changed to use the asterisk key only for blank identification this accuracy figure would be 100%.

Word groups are then identified by use of word list access unit 18b stored in program memory portion 18. For each token or word position there is identified a word group of alternative word choices or candidates formable from the letter groups represented by a respective code block reflecting one or more keystrokes. The word group is identified by accessing a stored dictionary-type word list of English words and determining which words hash to the key codes of the token.

Unknown words are addressed in word assembler unit 18f stored in program memory portion 18. If no dictionary word entry exists for the token, a character interpretation is constructed using partial dictionary matches, affix/suffix analysis, and by optimizing over character probabilities and transitional letter probabilities.

Sentence reconstruction can now proceed. A sentence is composed of a list of tokens terminated with a period. Each token is now labeled with a list of one or more character interpretations, defining a set of possible sentence interpretations. A dynamic programming algorithm is applied to eliminate candidates which are unlikely because of word-pair probabilities and grammatical constraints probabilities, and returns the most likely word sequence.

Detailed Operation

Aspects of the system operation will be considered in greater detail. The blank recognition process partitions the input stream into sequences of code strings or code blocks. Each code sequence represents a small number of consecutive English words, separated by the remaining unlabeled asterisks.

The dictionary matching phase seeks to map each code sequence with a unique word in a word list dictionary of nearly 50,000 words. Most of the words in the dictionary map to unique phone code sequences, however, approximately 16% of the phone codes collide with other dictionary words. The distribution of collisions is shown in FIG. 5. As an extreme case, the code string "22737" collides with eleven distinct English words, as shown in FIG. 6. Designing a good word list involves tradeoffs. All common words must be in the word list, although adding very seldom-used words might decrease the overall accuracy due to increased collisions with other words. The word list was built from an available word list enhanced by other common words. Abbreviations such as BMW and ACM were removed, yielding a word list with 53324 words hashed to 44474 code entries. The lookup succeeds with the chosen word list for about 80% of all tokens in unrestricted text entry.

For the case of tokens that can not be resolved in the previous phase a series of further reconstruction attempts is made by use of a word assembler unit 18f stored in memory portion 18. If the dictionary lookup fails, one reason might be that the code contains more than one English word. Thus an attempt is made to find a dictionary entry for a segment of the code which is delimited by an asterisk and starts at character position 0. If the attempt succeeds the code string is split at the asterisk position and a new token is created for the rest of the string. Single letters are not split off. For the new token with the code remainder the process restarts. Many tokens contain only two English words, and would be found in the dictionary had the separating asterisk had been interpreted as blank. If the split fails, the code string is checked for possible affixes. Suffixes and prefixes which are found in the code are stripped off, and the remaining string is looked up in the dictionary. If multiple entries exist, the most frequent entry is used. If no entry is found, the affix is discarded and the code is passed to the next subphase.

For words which are completely unknown to the dictionary, such as proper names and foreign terms, a recursive match procedure is used. The decode suggestion is assembled from partial matches of the code and dictionary entries. The final candidate is chosen from all possible matches according to the following preference list:

(1) The candidate with the most reconstructed characters wins.

(2) The candidate with the fewest partial matches wins.

(3) The candidate with the most preserved word boundaries wins, i.e., asterisks which turn to blanks.

This match routine is not able to reconstruct certain kinds of words that can not be constructed from English words, such as foreign names. To catch these cases a rejecting rule is applied: a string is accepted if it consists of at most two more partial matches than the number of contained blanks. Otherwise it is rejected.

For the remaining unknown words a dynamic programming algorithm is applied. A second-order transitional probability model is used, based on the probability of observing letter $L_i$ given previous letters $L_{i-2}L_{i-1}$, as estimated using the Brown Corpus. The Viterbi algorithm is a known form of dynamic programming algorithm for finding a global optimum for the given probabilities. It will be further described below, applied to words of a sentence rather than letters of a word.

The input for proceeding with sentence reconstruction is thus a list of tokens corresponding to a sentence of the text input. Each token or word position contains a word group including a list of one or more possible interpretations for its code block. Depending on the size of these interpretation lists, there may be an exponential number of possible sentence candidates. Grammatical constraints are employed within the Viterbi algorithm to eliminate unlikely or implausible candidates, to find the most likely sentence for the phone code string. The Viterbi algorithm is employed as follows. Let $X=X_0X_1 \ldots X_mX_{m+1}$ denote a given sequence of phone code tens, where the $X_i$ are the isolated word codes and $X_0$ and $X_{m+1}$ are the sentence delimiters. Further, let $Z=Z_0Z_1 \ldots Z_mZ_{m+1}$ be an English sentence consistent with X, where $Z_0$ and $Z_{m+1}$ are periods. The Viterbi algorithm seeks the interpretation Z that maximizes P(Z/X), the probability that Z caused X. It takes into account:

$P(Z_i/X_i)$, the probability that the word $Z_i$ was intended when the code $X_i$ was observed; and $P(Z_i/Z_{i-1})$, the transitional probability that the word $Z_i$ is observed when the previous word was $Z_{i-1}$.

Figure 7:
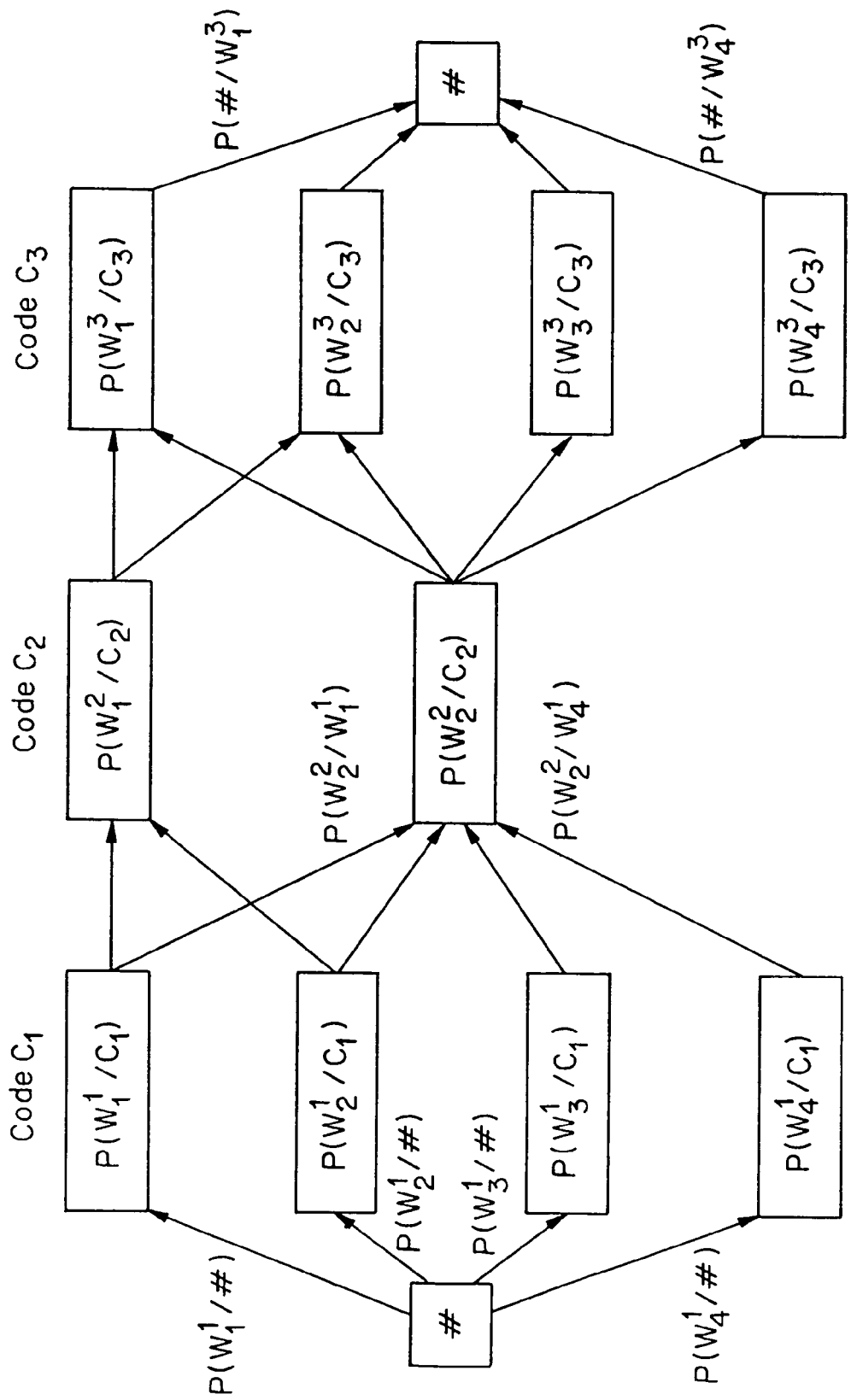
FIG. 7 is a trellis diagram useful in describing operation of the invention.

A directed graph or trellis as illustrated in FIG. 7 represents the word lattice that forms the set of sentence candidates. Each of the nodes and edges have values or costs assigned to them. The node costs are the word probabilities for the observed code, while the edge costs are the transition probabilities between word pairs. Any path between the start and end nodes represents a possible sentence. The Viterbi algorithm was used to find the maximum-cost path in the trellis using dynamic programming. A detailed description of the Viterbi algorithm is provided in "Experiments in Text Recognition With Binary N-gram and Viterbi Algorithms", *IEEE Trans. Pattern Analysis and Machine Intelligence*, PAMI-4: 520-530, 1982. With an understanding of the invention, skilled persons will also be enabled to use hidden-Markov-models, neural networks or other analysis approaches in implementation of the invention.

To compute the word transition probabilities, all word pairs in the Brown Corpus were examined. Each entry in the word list dictionary contains the list of words which follow it, and the corresponding transitional probabilities. To account for word pairs which did not occur in the corpus, $P(W^{i+1}/W_i)=1/count_{w_i}^2$ is used to estimate the probability of word $W_{i+1}$ given $W_i$, which itself occurred $count_{w_i}$ times in the corpus. Since the transition probability is at least $P(W_{i+1}'/W_i)=1/countW_i$ if word pair $W_{i+1}'W_i$ occurs in the corpus, this gives preference to the pair which actually appeared. However, $W_{i+1}'$ might have a larger stand-alone frequency than $W_{i+1}$, and thus lead to a more costly or higher value path and hence better interpretation.

The Viterbi algorithm takes word and word-pair frequencies into account, but no grammar rules are considered. Thus the selected sentence may not be grammatically plausible. To ensure implausible sentences are rejected, each word in the dictionary is augmented with a tag that indicates the corresponding grammatical word category. The Brown Corpus contains about 30 different word tags, which again might be combined with each other for word categories. Examples of word tags are shown in FIG. 8. A total of 132 combinations were used, each of which became a word category in the underlying dictionary. The words that appear with more than one category became multiple entries in the dictionary each with a different tag and with its own frequency count. Word-pair frequencies were collected for the words in regard to their word category tags.

A corpus was created solely of tags and the period. From that collection of sentences, bigram (word pair) frequencies for the tags were collected. From that data, transitional probabilities for the tags were derived, to be taken into account by the Viterbi algorithm as additional edge cost probability values. The word and word-pair frequency costs of the standard Viterbi algorithm were combined with the tagged costs. For some constant $0 \leq c \leq 1$, $Cost_{Path}=(1-c) \cdot Cost_{stand}+c \cdot Cost_{tags}$ trades off the grammatical categories of the word nodes with their transitional probabilities. After experimentation, c=0.4 was found to give the best results. The Brown Corpus is the source for the word categories. The augmented dictionary contained words which did not appear in the corpus, and were hence untagged, effecting performance. To reduce the amount of words without tags, some tagging 'by hand' was performed on the dictionary.

A performance analysis of results achieved by use of the reconstruction system utilizing the invention is provided in FIG. 9. Shown are the percentage of characters/words identified, errors made, and time spent for each phase of the algorithm of the total errors 71% were made in reconstructing words not in the dictionary, although over 87% of the characters in such words were correctly reconstructed.

Figure 12:
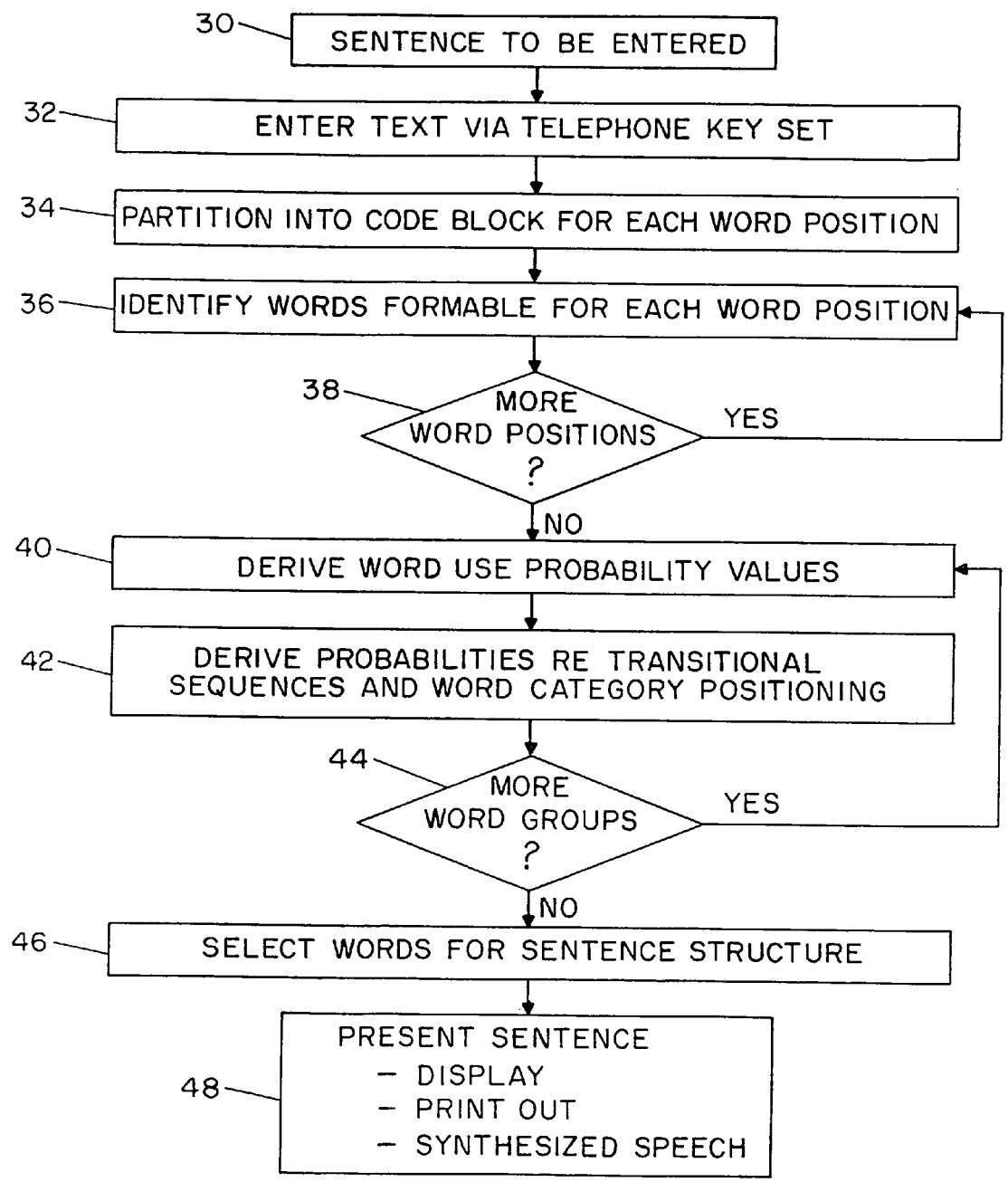
FIG. 12 is a flow diagram useful in describing a sentence reconstruction method in accordance with the invention.

Several text samples as identified in FIG. 10 were encoded by the telephone keypad code and reconstructed by the system. These samples were passed through a filter to spell out ordinal and cardinal numbers which occurred in the texts. The system performed remarkably well, correctly decoding more than 95% of all characters in all samples, and greater than 99% of the words used in selected speeches of President Clinton, which are considered the most representative of modern English of these text samples. FIG. 12 provides an analysis of the effectiveness of the different phases of operations. The unknown-word analysis accounts for the largest share of errors, which is not surprising since none of these words occur in the word list dictionary as assembled. Still, the system correctly identified over 87% of the characters in these words. Sentence disambiguation (i.e., selection of the correct word in cases of ambiguity) accounts for most of the computing time and almost all of the remaining errors, however the accuracy is still remarkably high. It is not believed that significantly higher accuracy rates are possible without actual comprehension of the text, which is clearly an unsolved and possible unsolvable problem.

FIG. 11 provides an actual example provided by operation of a reconstruction system utilizing the invention. The Gettysburg Address was entered using a standard type of three-letter-per-key telephone keypad. After reconstruction by the system the Address included only the four reconstruction errors which are shown highlighted.

With reference now to FIG. 12, there is provided a flow chart useful in describing a sentence reconstruction method in accordance with the invention. At 30 there is represented a sentence structure in the form of an English language sentence to be entered. FIG. 12 particularly relates to the resolving of word ambiguities in English language sentence structures entered using single stroke activation of a standard type of telephone key set including number keys which are usable as text entry keys which each ambiguously represent a group of three letters. The method includes the following steps:

(a) at step 32 providing first key stroke indicia each ambiguously representing a letter of a group of letters and second key stroke indicia including indicia representing spaces between words;

(b) at step 34 partitioning, by use of the second key stroke indicia, the first key stroke indicia into a sequence of word positions, each word position comprising a code block represented by at least one of the first key stroke indicia;

(c) at step 36 accessing a database including a word list to identify for an individual word position a word group including alternative word choices formable from the letter groups represented by the step 34 code block for such word position;

(d) at step 38 repeating step 36 for the sequence of remaining word positions to identify a corresponding word group including at least one word choice for each of a plurality of word positions;

(e) at step 40 utilizing a stored word use rule set representative of relative frequency of particular word usage in the selected language to derive (for the word group for one of the word positions) probability values for word choices for that word position;

(f) at step 42 utilizing a stored language rule set representative of usage in the selected language to derive probability values for a sequencing of individual word choices for such word position relative to at least one word choice for an adjacent word position in the sentence structure, the language rule set including rules in at least one of the following categories (i) rules based on transitional probability of use of particular word sequences, and (ii) rules based on probability of relative positioning of words of particular word categories in a sentence structure;

(g) at step 44 repeating steps 40 and 42 for any additional word positions having an associated word group including a plurality of alternative word choices;

(h) at step 46 selecting, by use of the probability values derived in steps 40 and 42, one word from each word group for inclusion at a respective word position in the sentence structure; and (j) at step 48 using the words selected in step 46 to provide a reconstruction of the entered sentence structure in at least one of the following forms: a viewable display, a printout, a synthesized speech output.

A sentence reconstruction method as described may desirably be implemented so that the language rule set utilized in step 42 includes rules in both of the categories (i) and (ii) and step 46 comprises selecting words for inclusion in the sentence structure based upon the highest relative probability values as derived in steps 40 and 42. Particularly for entry of a series of sentences, in step 32 the second key stroke indicia additionally includes indicia representing a period delimiting the sentence structure and step 34 additionally includes partitioning the word positions into at least one sentence. As discussed above, some word constructions may result in the absence of a match upon accessing of the stored word list. Such non-match cases can be addressed by including between steps 36 and 38 an additional step as follows:

(x) for each word position for which no word group including at least one word choice is identified in step 36, utilizing a stored word assembler unit to attempt to identify at least one of a suffix construction, a prefix construction and a combination word construction, and to thereby identify a word group including at least one word choice for such word position. The word assembler unit would typically be an additional program unit 18f stored in program memory portion 18.

The invention has been described in the context of use with a particular text entry convention and application to entry of English language text via a telephone type keypad. With an understanding of the invention it will be apparent to skilled persons that the invention may be utilized in a wide variety of conventions and applications. Thus, the zero key or any other suitable convention can be employed for entry of the letters Q and Z for example. Also, text represented in computer memory may be the result of many forms of text entry characterized by the potential for ambiguity as to which specific word is intended to be present at a particular word position in a sentence structure. Other examples and applications arising from use of ambiguous or overloaded keyboards include:

Text entry for languages with large alphabets. In languages such as Chinese, which use character sets with thousands of symbols, text may be entered using a conventional typewriter keyboard. Thus, the user may type in a phonetic pronunciation of each character and the resulting character ambiguity can be addressed by sentence reconstruction in accordance with the invention.

Minimizing hand motion on a QWERTY keyboard. To speed text entry or minimize required finger motion on a conventional QWERTY keyboard (implicated in physical stress ailments such as carpel-tunnel syndrome) a typist can type without moving fingers from the "home" row of keyboard keys. Thus, one home key is used to ambiguously represent the home key letter, as well as the letters on the adjacent keys above and below the home key. With use of the invention on a word processor, for example, the ambiguous entered text would be reconstructed and displayed to the typist, who could then correct any reconstruction errors.

Customized keyboards for text entry. Improved, simplified an faster keyboards can be provided for applications such as court stenography, one-handed chord keyboards, or smaller special purpose keyboards for portable computers. Resulting ambiguities in entered text can then be addressed by sentence reconstruction using the invention.

Keyboards for the disabled. Severely handicapped persons may not have enough physical control or range of movement to use a full keyboard. A special keyboard may include only six to ten keys. Entry of text with such simplified keyboards will result in ambiguities addressable by use of the present invention. Text can thus be entered with a significantly reduced range of movement.

Other examples of activities resulting in word ambiguities to which the invention can be applied include the following. Voice recognition of spoken or dictated sentences produces computerized storage of spoken words which may be incorrect or ambiguous because of an inability of the voice recognition system to accurately select the correct word between words which sound alike and for a variety of other reasons such as mispronunciation. If a computerized system is adopted to translate from a foreign language into English, for example, certain of the foreign words may have several potentially correct English counterparts, with the translation system unable to accurately choose among the English alternatives. Text input in hurried or inexpert fashion via a standard typewriter-type keyboard may result in entered text containing enough errors that for particular word positions the entered letters could represent more than one word. In these and other applications, there can exist ambiguities as between which of several possible words is intended to be presented at a particular word position. In the telephone keypad text entry example, for a particular word position the word group is determined by available permutations of the three telephone key letters for each letter position of a word. Other word association criteria for other applications include phonetic word association, similarly spelled word association, definitional alternatives of translated words, etc. In view of the described capabilities of systems and methods in accordance with the invention, it will be apparent that entry unit 10 of FIG. 1 can utilize or implement any one of a variety of sentence structure input techniques or configurations effective to result in storage in memory portion 16 of a sentence structure with one or more word ambiguities susceptible to sentence structure reconstruction methods and systems utilizing the invention. Further, while the invention is described with reference to English as the selected language, it can also be applied for use with other languages.

For purposes of example, particular applications of the invention may include communication with hearing impaired persons by text entry from any telephone-type keypad without telephone operator intervention. The hearing impaired person could use a full keyboard and computer screen, with text-to-speech synthesizer feedback enabling the telephone keypad user to hear results of his keypad input. For E-mail without a terminal a telephone user would be enabled to write E-mail and receive E-mail messages via a speech synthesizer. In voice response systems limitations currently require some user inquiries to be recorded for later action. With the invention a user's name, address and other information could be entered and reconstructed with sufficient fidelity to enable requested literature to be mailed without human intervention, for example.

While there have been described the currently preferred embodiments of the invention, those skilled in the art will recognize that other and further modifications may be made without departing from the invention and it is intended to claim all modifications and variations as fall within the scope of the invention.

What is claimed is:

1. A device having stored codes executable by a processor for causing the processor to perform method steps to resolve ambiguities in keyboard entries, the method comprising the steps of:
   receiving a stream of digits in a sequence according to sequence of key selection from said keyboard, each key of said keyboard outputting upon selection a unique digit representing more than one letters;
   matching said stream of digits in sequence against a look-up-table of known words; and
   outputting one of a plurality of known words matched from said look-up-table based on a higher probability dependent from a category of a previously matched word in a sentence including the output word and the previously matched word.

2. The device according to claim 1, further including codes for causing said processor to reconstruct a word if no known words stored in the look-up-table matches said stream of digits.

3. The device according to claim 2, further including codes for causing said processor to select a plurality of words based on probability of occurrence.

4. The method according to claim 1, further including the steps of:
   retrieving partial matches if there is no match of a known word;
   performing affix or suffix analysis on said stream of digits; and
   removing affixes suffixes found to reconstruct a known work.

5. The method according to claim 1, further including:
   recursively constructing said string of digits to a proper name if there is no match of a known word.

6. The method according to claim 1, further including:
   outputting all known words if more than one known word matches said string of digits; and
   choosing one of said matches and use the chosen word in a sentence.

7. The method according to claim 6, further including the steps of:
   reconstructing a plurality of words based on probability of occurrence;
   choosing words based on proper position; and
   editing unknown words to form a sentence.

8. The method according to claim 1, further including:
   outputting one of a plurality of known words matched from said look-up-table based on a higher probability dependent from a preceding word.

9. The device according to claim 1, wherein said look-up-table is a listing of non-English characters correlated with predetermined digit strings based on phonetics.

10. The device according to claim 9, wherein said non-English characters are Chinese.

11. A device for resolving ambiguities in letter entries, comprising:
    a processor and associated storage for storing a program executable by said processor;
    a database of words addressable against a string of digits; and
    a keyboard for outputting said string of digits to said database, said keyboard having a plurality of keys, each of which outputting a digit representing more than one letters, wherein said processor executes said program to cause an output of a word from said database based on said string of digits received from said keyboard and a category of a previously matched word in a sentence including the output word and the previously matched word.

12. The device according to claim 11, further including a display for displaying said word output from said database.

13. The device according to claim 11, wherein said keyboard has less than twenty-four (24) keys.

14. The device according to claim 11, wherein said keyboard is a QWERTY-keyboard.

15. The device according to claim 11, wherein said program includes codes executable by said processor for reconstructing a word if no word in said database matches said string of digits.

16. The device according to claim 15, wherein said program includes codes executable by said processor for selecting one of a plurality of words output from said database on probability of occurrence.

17. The device according to claim 16, wherein a word is chosen based on a preceding word.

18. The device according to claim 11, wherein a plurality of words matching said string of digits is displayed, and one of said plurality of words is chosen by entry of one of said keys on said keyboard.

19. The device according to claim 11, wherein said database stores non-English characters matched against said string of digits, said string of digits being chosen based on a phonetic representation of said non-English characters.

20. A device having stored codes executable by a processor for causing the processor to perform method steps to resolve ambiguities in keyboard entries, the method comprising the steps of:
    receiving a stream of digits in a sequence according to sequence of key selection from said keyboard, each key of said keyboard outputting upon selection a unique digit representing more than one letters;
    matching said stream of digits in sequence against a look-up-table of known words, wherein said look-up-table is a listing of non-English characters correlated with predetermined digit strings based on phonetics;

determining a known word if there is a match from said matching of said stream of digits;

matching the known word against a look-up-table of known characters;

determining a known character if there is a match from said matching of the known word; and outputting a character corresponding to the known word, wherein ambiguities in determining the known character are resolved according to a sentence reconstruction.

21. The device according to claim 1, wherein the sentence reconstruction includes determining a transitional probability of a use of the character in a sequence of characters.

22. The device according to claim 1, wherein the sentence reconstruction includes determining a probability of relative position of characters including the character based on categories of at least another character in a sequence of characters.

\* \* \* \* \*